(12) United States Patent
Takahashi et al.

(10) Patent No.: US 6,181,443 B1
(45) Date of Patent: *Jan. 30, 2001

(54) COPYING APPARATUS CAPABLE OF EXPOSING AND SCANNING BOTH-SIDE ORIGINAL

(75) Inventors: Tadashi Takahashi, Yokohama; Ryosuke Miyamoto, Urayasu; Hideaki Shimizu, Yokohama; Hiroyuki Yaguchi, Inagi; Yasuhiro Takiyama, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/674,189

(22) Filed: Jul. 1, 1996

(30) Foreign Application Priority Data

Jul. 4, 1995 (JP) .................................................. 7-168706

(51) Int. Cl.⁷ ...................................................... H04N 1/04
(52) U.S. Cl. ........................... 358/498; 358/496; 358/444
(58) Field of Search ..................................... 358/497, 494, 358/474, 404, 444, 524, 498, 496, 401; 399/364; 271/291, 288, 225, 3.19

(56) References Cited

U.S. PATENT DOCUMENTS

| | | | |
|---|---|---|---|
| 4,145,136 | | 3/1979 | Takahashi ............................ 399/153 |
| 4,169,275 | * | 9/1979 | Gunning ............................... 358/444 |
| 4,275,423 | | 6/1981 | Takahashi et al. ................... 358/474 |
| 4,984,779 | * | 1/1991 | Iwasaki ................................ 271/291 |
| 5,132,787 | * | 7/1992 | Omi ..................................... 358/524 |
| 5,197,724 | * | 3/1993 | Kitajima et al. ..................... 271/291 |
| 5,438,435 | * | 8/1995 | Lawniczak ........................... 358/496 |
| 5,452,108 | * | 9/1995 | Muramatsu .......................... 358/497 |
| 5,486,911 | * | 1/1996 | Rubscha et al. .................... 399/364 |
| 5,513,017 | * | 4/1996 | Knodt et al. ........................ 358/498 |
| 5,532,839 | * | 7/1996 | Beikirch et al. ..................... 358/498 |
| 5,784,680 | * | 7/1998 | Taruki ................................. 399/364 |
| 6,032,941 | * | 3/2000 | Endo ................................... 271/291 |

* cited by examiner

*Primary Examiner*—Cheukfan Lee
(74) *Attorney, Agent, or Firm*—Fitzpatrick, Cella, Harper & Scinto

(57) ABSTRACT

An original is allowed to pass on an exposing glass along a conveying path, thereby exposing and scanning a front surface of the original and reading an image by a CCD. A back surface of the original is subsequently fed to the exposing glass along a conveying path and is allowed to pass on the exposing glass, thereby exposing and scanning the back surface of the original. The image data read by the CCD is stored into an image buffer. The order of address columns to read out the image data on the front surface and the order of address columns to read out the image data of the back surface are made opposite. Thus, a copying apparatus which can efficiently expose and scan both of the front and back surfaces of a both-side original is provided.

16 Claims, 8 Drawing Sheets

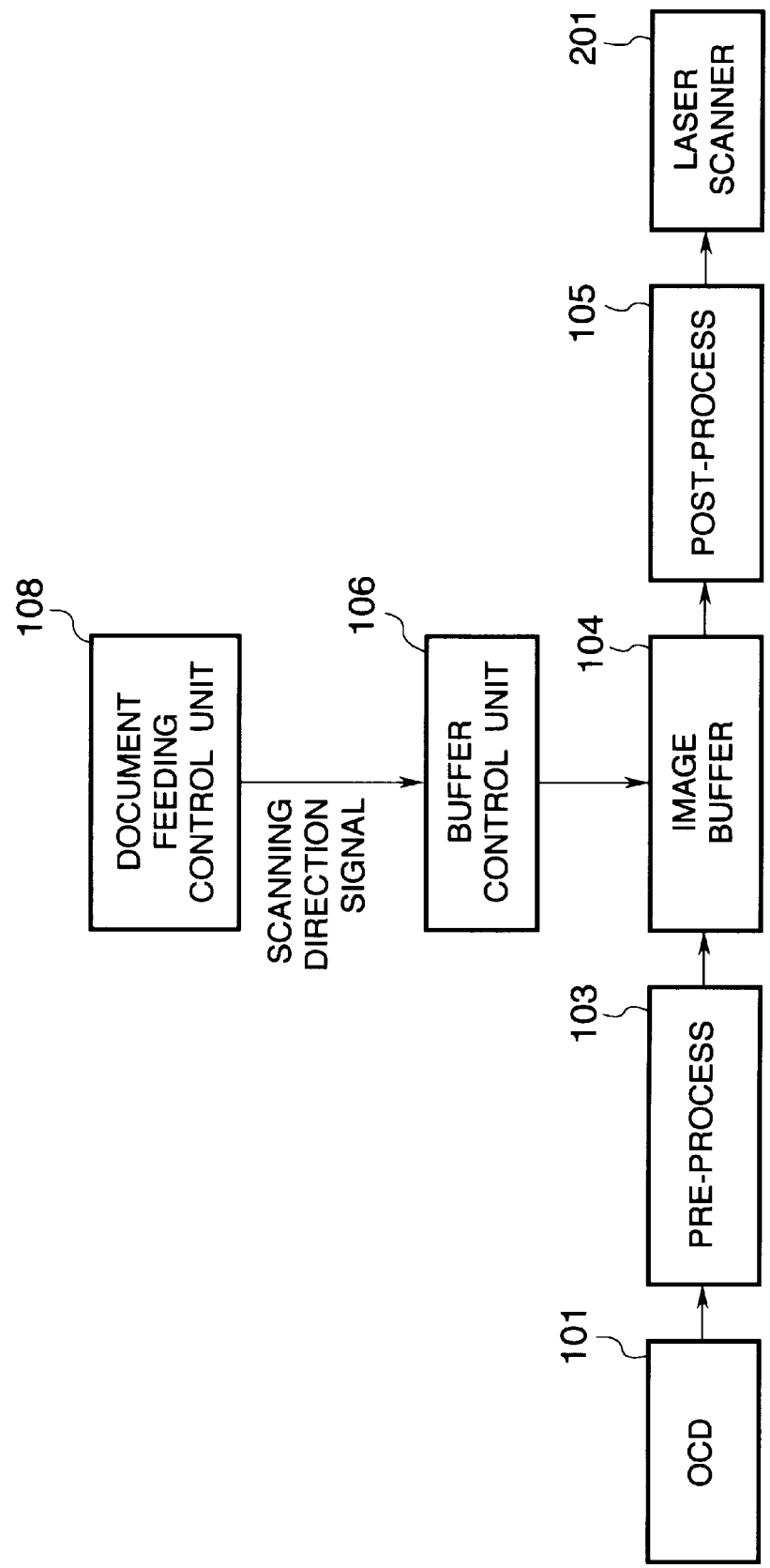

COPYING APPARATUS CAPABLE OF EXPOSING AND SCANNING BOTH-SIDE ORIGINAL

BACKGROUND OF THE INVENTION

1. Field of the Invention

The invention relates to a copying apparatus for exposing and scanning each surface of a both-side original in the first and second directions.

2. Related Background Art

As a copying apparatus of a high productivity, there is a copying apparatus in which an original is exposed by passing the original through an exposing unit in a state in which the exposing unit is stopped at a predetermined position. Such a kind of copying apparatus is called a flow-reading type. In such a copying apparatus of the flow-reading type, as compared with a copying operation in which an original is exposed by moving the exposing unit, the operation to returning the exposing unit to the home position is not performed, so that productivity can be raised by such an amount corresponding to the returning operation.

However, although the copying apparatus of the flow-reading type is effective for a one-side original, in order to pass both of the front and back sides of the both-side original in the same direction, the original has to be switched back in the middle of an original conveying path, so that there is a drawback such that it takes time to feed the original and the productivity deteriorates. If the front and back sides are allowed to pass in the opposite directions, since there is no need to switch back the original, the productivity does not deteriorate. There is, however, an inconvenience such that one surface is copied in a manner of a mirror image of the original.

According to a copying apparatus in which the exposing unit is moved and the original is exposed, if the apparatus is constructed in a manner such that in case of the original of the odd-number designated page, the exposing unit is moved forward and exposes the original, and in case of the original of the even-number designated page, the exposing unit is moved backward and exposes the original, the returning operation of the exposing unit can be used to expose the original, so that the productivity can be raised. However, even in this case, there is an inconvenience such that the page of either one of the odd page and the even page is copied in a manner of a mirror image of the original.

SUMMARY OF THE INVENTION

It is an object of the invention to provide a copying apparatus which can solve the above problems.

Another object of the invention is to provide a copying apparatus which can efficiently expose and scan both of the front and back sides of a both-side original at a high speed.

The above and other objects and features of the present invention will become apparent from the following detailed description and the appended claims with reference to the accompanying drawings.

BRIEF DESCRIPTION OF THE DRAWINGS

FIG. 7 is a block constructional diagram in a range from a CCD 437 to the laser scanner 201.

DETAILED DESCRIPTION OF THE PREFERRED EMBODIMENTS

[Form 1]

Figure 1A:
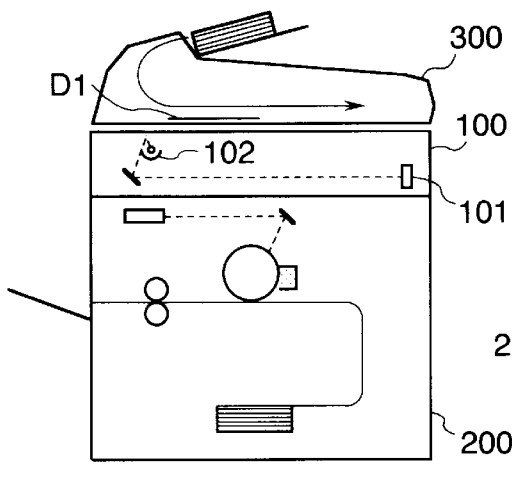
FIGS. 1A to 1D are diagrams showing a construction and the operation of a copying apparatus.

FIGS. 1A to 1D are diagrams showing the operation of a copying apparatus. First, an automatic document feeder 300 separates an original D1 from a bundle of originals, feeds the original D1 in the direction shown by an arrow in FIG. 1A, and stops the original at a predetermined position on a platen glass of a document reading apparatus 100. In this instance, an optical system 102 having an exposing lamp and mirrors is stopped on the left side. When the original D1 is set onto the platen glass, the optical system 102 is moved in the direction shown by an arrow in FIG. 1B by a motor (not shown) and exposes and scans the original D1 on the platen glass. The reflected light from the original D1 which was exposed and scanned is directed to a linear CCD 101, thereby reading an image of the original D1. After completion of the exposure and scan of the original D1, the optical system 102 is not moved backward but is stopped at the position where the exposure and scan were finished. In this stop state, the optical system 102 enters a standby state for the next exposure and scan.

An image signal read by the CCD 101 is inputted to a laser scanner 201 of an image forming apparatus 200 through a post-processing circuit 105 which performs edge emphasis, smoothing, moire removal, etc. The laser scanner 201 emits a laser beam according to the inputted image signal. The laser beam is led to a photosensitive drum 202 by a mirror. A latent image is formed on the photosensitive drum 202 by the laser beam and is developed by a developing device 206. The developed image is transferred to a sheet fed from a cassette 203 and is fixed by a fixing device 204. The sheet on which the image was fixed is ejected to a tray 205.

Figure 1B:
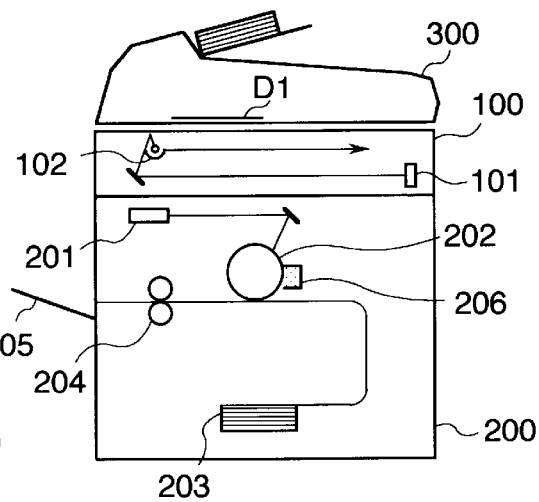
Figure 1C:
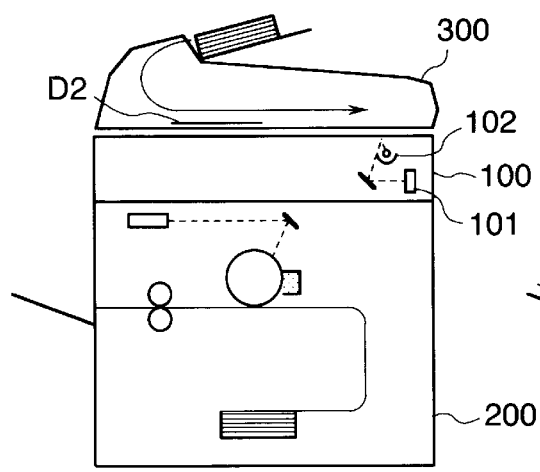
Figure 1D:
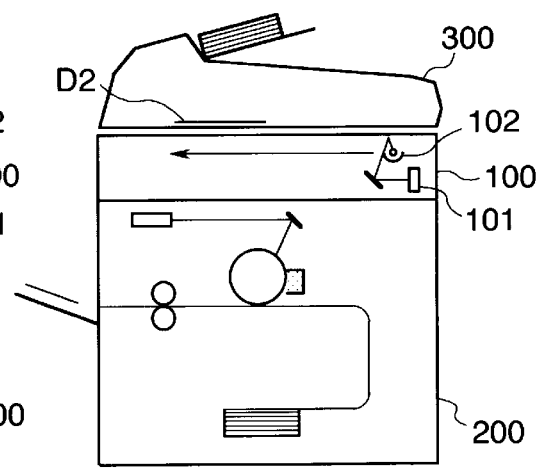

Subsequently, the automatic document feeder 300 separates an original D2 from the bundle of originals, feeds it onto the platen glass, and stops it (FIG. 1C). When the original D2 is set onto the platen glass, the optical system 102 which was stopped on the right side is moved in the direction shown by an arrow in FIG. 1D, thereby exposing and scanning the original D2 on the platen glass. An image of the original D2 is also read by the CCD 101 in a manner similar to the above. As mentioned above, since the optical system is not returned to the home position after the originals were exposed and scanned one by one, the time is reduced by a time that is required for returning the optical system. Thus productivity of the copying apparatus can be improved. Since the scanning direction of the original D2 is opposite to the scanning direction of the original D1, the image is a mirror image at a time point when the original D2 was read.

Figure 2:
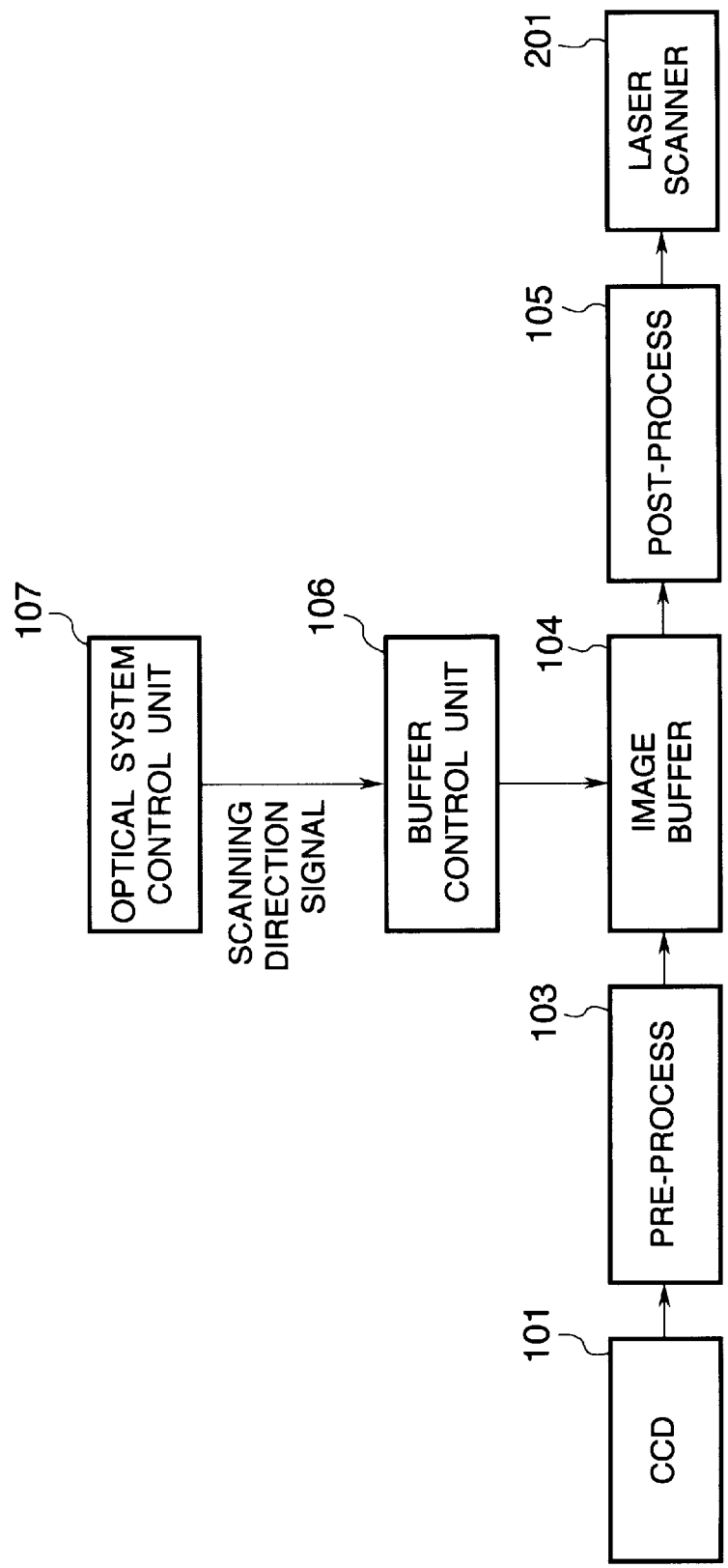
FIG. 2 is a block constructional diagram in a range from a CCD 101 to a laser scanner 201.

FIG. 2 is a block constructional diagram in a range from the CCD 101 to the laser scanner 201. An analog image signal is outputted from the CCD 101 and is subjected to an A/D converting process, a shading process, a color correcting process, and the like by a pre-processing circuit 103.

Digital image data outputted from the pre-processing circuit 103 is stored in an image buffer 104. The image buffer 104 can store two or more images of an original of the A3 size. A write and read address control of the digital image data for the image buffer 104 is performed by a buffer control unit 106. The buffer control unit 106 performs the address control in accordance with a scanning direction signal which is outputted from an optical system control unit 107 to control the movement of the optical system 102.

Figure 3:
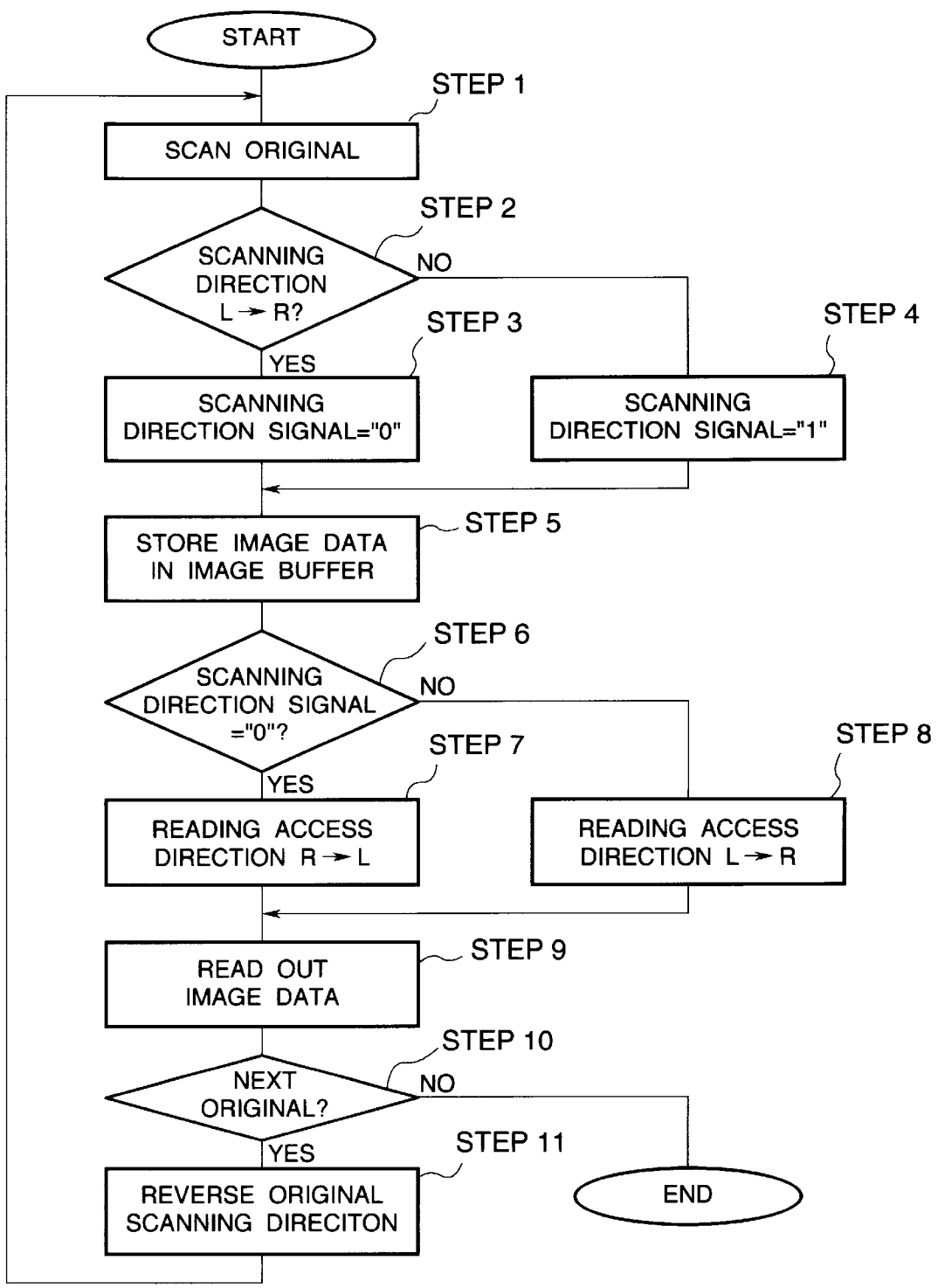
FIG. 3 is a flowchart for an address control of an image buffer 104.
Figure 4A:
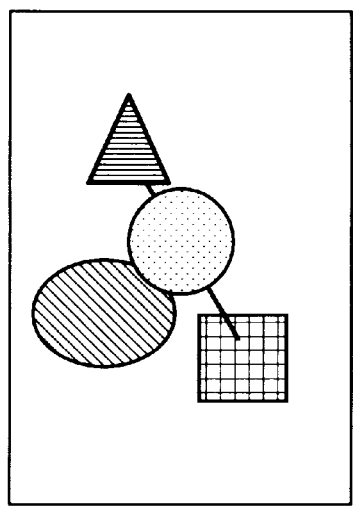
FIGS. 4A to 4C are diagrams for explaining the address control of the image buffer 104.
Figure 4B:
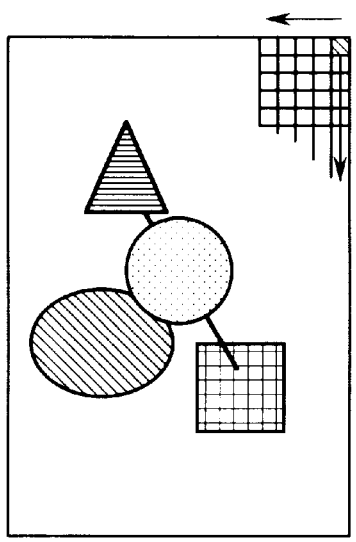
Figure 4C:
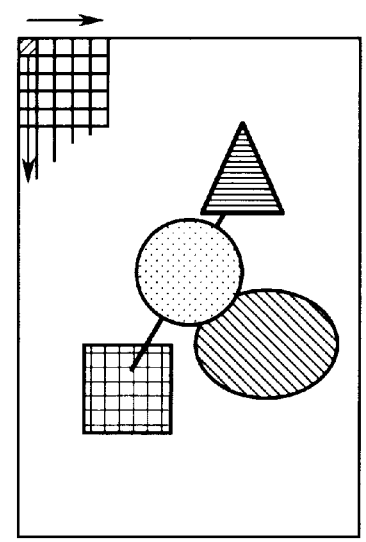

FIG. 3 is a flowchart for the address control of the image buffer 104 by the optical system control unit 107 and buffer control unit 106. First, the optical system 102 is moved and exposes and scans the original on the platen glass (step 1). In case of the first original, the optical system 102 is moved from the left to the right (L→R) as shown in FIG. 1B. In case of the scanning direction from the left to the right (L→R), the scanning direction signal is set to "0" (steps 2 and 3). In case of the scanning direction from the right to the left (R→L), the scanning direction signal is set to "1" (steps 2 and 4). The scanning direction can be also decided on the basis of a result of the counting of an original feeding number counter in the automatic document feeder 300. The digital image data which is outputted through the CCD 101 and pre-processing circuit 103 is stored into the image buffer 104 (step 5). In this instance, the digital image data corresponding to the analog image signal outputted from the CCD 101 which read the original shown in FIG. 4A is sequentially stored in a column into the image buffer 104 as shown by an arrow in FIG. 4B. The address control is executed so as to sequentially perform the storage of each column from the right to the left (R→L). Subsequently, a check is made to see if the scanning direction signal is equal to "0" (step 7). If YES, the order of the columns to be read out from the image buffer 104, namely, the reading access direction is set to the direction from the right to the left (R→L) as shown in FIG. 4B (step 7). When the scanning direction signal is not equal to "0", namely, it is equal to "1", the reading access direction is set to the direction from the left to the right (L→R) as shown in FIG. 4C (step 8). The address control is performed so as to read out the digital image data from the image buffer 104 in the access direction decided in step 7 or 8 (step 9). When there is the next original in the automatic document feeder 300 (step 10), the original scanning direction is reversed. Namely, in case of (L→R), the original scanning direction is set to (R→L), and in case of (R→L), it is set to (L→R) (step 11). The processing routine is returned to step 1. When there is no next original in step 10, the processing routine is finished.

By such a control of the reading access direction, even if the original D2 as mentioned above is read as a mirror image, it becomes the original image at the stage in which it is outputted to the image forming apparatus. The same image as the original can be copied for both of the originals D1 and D2. As mentioned above, a high speed copying apparatus can be provided by the movement control of the optical system 102 and the address control of the image buffer 104.

In the above embodiment, although the address when reading out the image data from the image buffer 104 has been controlled, the address when the image data is stored into the image buffer 104 can be also controlled by the buffer control unit 106. Namely, it is also possible to construct in a manner such that when the scanning direction signal is equal to "0", a writing access direction of the digital image data is set to (R→L) in step 5 and, when it is equal to "1", the writing access direction is set to (L→R) and the reading access direction is always set to (R→L).

[Form 2]

Figure 5:
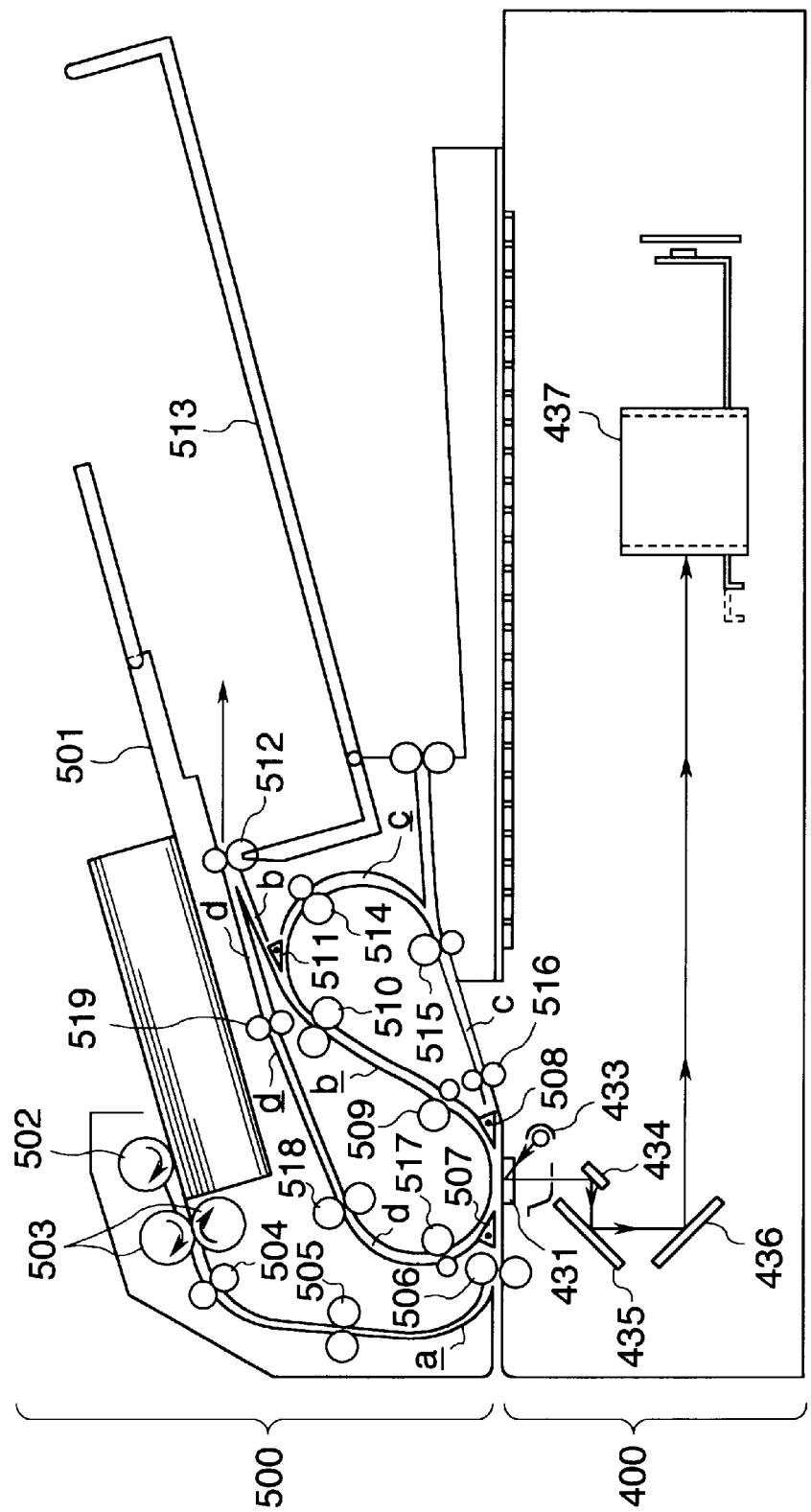
FIG. 5 is a diagram showing a document reading apparatus and an automatic document feeder of the copying apparatus.

FIG. 5 shows a document reading apparatus 400 and an automatic document feeder 500 of the copying apparatus. The document reading apparatus 400 is connected to the image forming apparatus 200 in FIGS. 1A to 1D. The document reading apparatus 400 has: an exposing lamp 433 for exposing the original which passes on an exposing glass 431; and a CCD 437 for reading the reflected light from the original which is guided by mirrors 434, 435, and 436 and passes on the exposing glass 431. A method for exposing and scanning of the document reading apparatus 400 is called a flow-reading.

As shown in the diagram, the automatic document feeder 500 has conveying paths a to d and can feed an original so that a one-side original passes on the exposing glass 431 or both of the front and back surfaces of a both-side original pass on the exposing glass 431. In case of the one-side original, the original in the top portion of a bundle of originals stacked on an original tray 501 is separated and fed by a pickup roller 502 and a separating roller 503 and is fed onto the exposing glass 431 by rollers 504, 505, and 506. In this instance, a flapper 507 is in an upside-up state and flappers 508 and 511 are in an upside-down state. The original is exposed and scanned by passing on the exposing glass 431 and is ejected to an ejecting tray 513 by rollers 509, 510, and 512. As mentioned above, in case of the one-side original, the conveying paths a and b are used.

In case of the both-side original, the flapper 507 is in the upside-up state, the flapper 508 is in the upside-down state, and the flapper 511 is in the upside-up state. By feeding the original in this state, the front surface of the original is exposed and scanned. The original after completion of the exposure of the front surface is conveyed so as to be reversed by rollers 509, 510, 514, 515, and 516 and is fed to the exposing glass 431. In this instance, the flapper 508 is in the upside-up state and the flapper 507 is in the upside-down state. The original passes on the exposing glass 431 in the direction opposite to the direction in case of the front surface, so that the back surface of the original is exposed and scanned. The original after completion of the exposure of the back surface is ejected to the ejecting tray 513 by rollers 517, 518, 519, and 512. In case of the both-side original, the conveying paths a, b, c, and d are used as mentioned above.

Figure 6A:
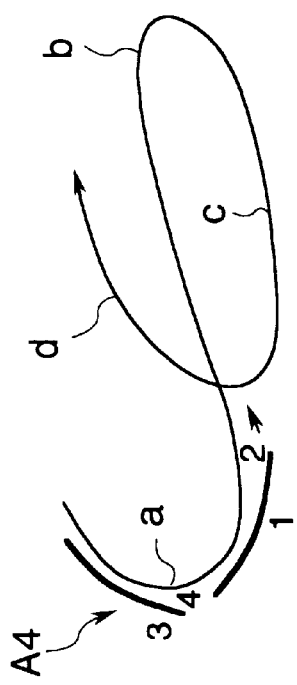
FIGS. 6A to 6D are diagrams for explaining a document feeding in case of a both-side original.
Figure 6B:
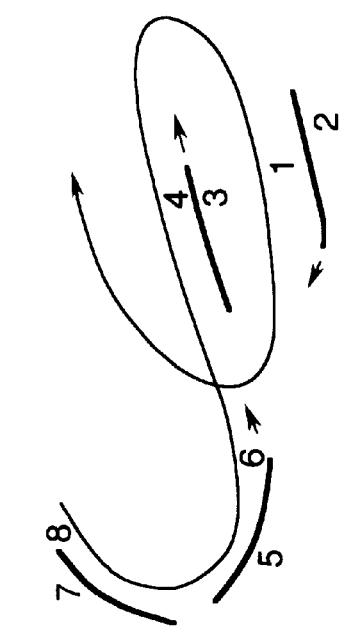
Figure 6C:
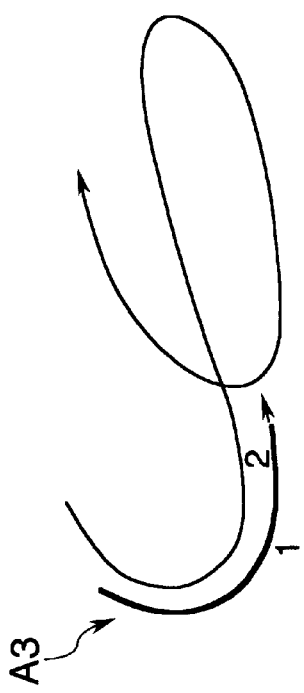
Figure 6D:
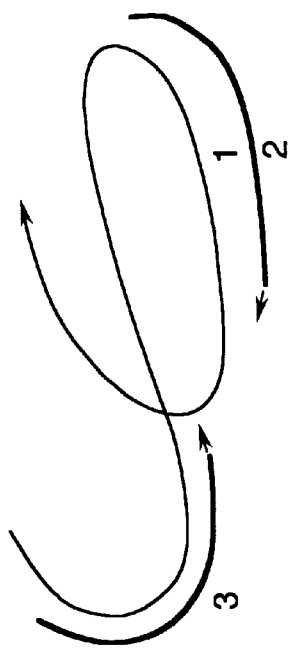

FIGS. 6A and 6B are diagrams for explaining a document feeding in case of a both-side original of the A4 size. FIGS. 6C and 6D are diagrams for explaining a document feeding in case of a both-side original of the A3 size. As shown in the diagrams, the A4 original is sequentially exposed in accordance with the order of the first page, third page, second page, fourth page, fifth page, seventh page, . . . , thereby reducing a vacant time of the exposing unit as much as possible. As shown in the diagrams, the A3 original is sequentially scanned in accordance with the order of the first page, second page, third page, . . . . . As for the both-side original of any one of the A4 and A3 sizes, the scanning direction of the odd page and the scanning direction of the even page are opposite.

FIG. 7 is a block constructional diagram in a range from the CCD 437 to the laser scanner 201. The buffer control unit 106 performs the address control in accordance with a scanning direction signal which is outputted from the document feeding control unit 108 to control the document feeding in the automatic document feeder 500 mentioned above. In case of an original of a size smaller than the A4 size, the buffer control unit 106 can control so that the image data stored in the image buffer 104 in accordance with the order of the first page, third page, second page, fourth page, ... is sequentially read out in accordance with the order of the first page, second page, third page, fourth page, .... The description about the pre-processing circuit 103 and a post-processing circuit 105 is omitted because it is similar to that in FIG. 2.

Figure 8:
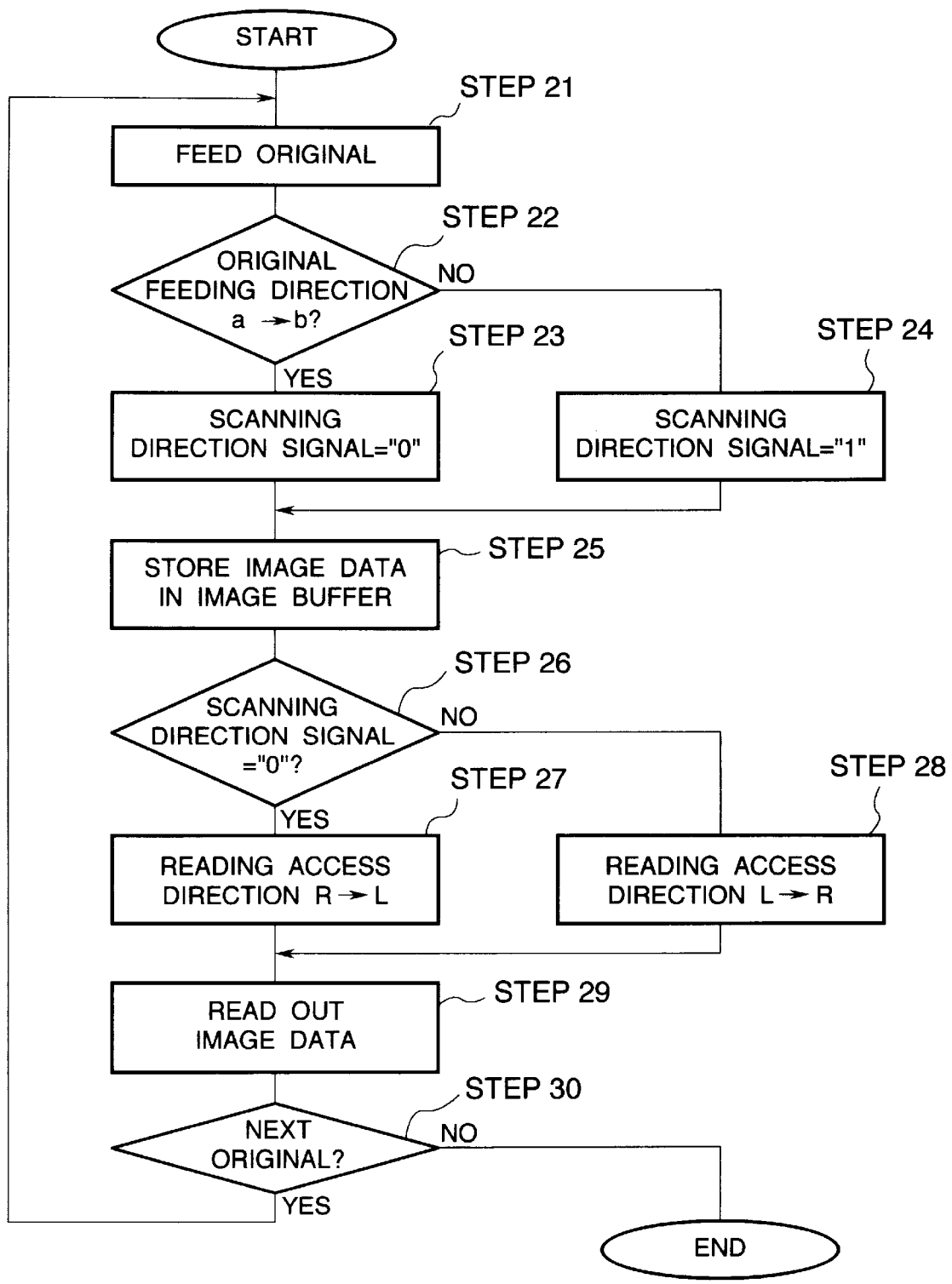
FIG. 8 is a flowchart for the address control of the image buffer 104.

FIG. 8 is a flowchart for the address control of the image buffer 104 by the document feeding control unit 108 and buffer control unit 106. First, the original is fed to the exposing glass 431 as described above (step 21). When the front surface is exposed and scanned, namely, when the original feeding direction is set to the direction from the conveying path a to the conveying path b (a→b), the scanning direction signal is set to "0" (steps 22 and 23). When the original feeding direction is set to the direction from the conveying path c to the conveying path d (c→d), the scanning direction signal is set to "1" (steps 22 and 24). The original feeding direction is discriminated on the basis of the counting result of the original feeding number counter in the document feeding control unit 108. The digital image data which is outputted through the CCD 437 and pre-processing circuit 103 is stored in the image buffer 104 (step 25). In this instance, the digital image data corresponding to the analog image signal outputted from the CCD 437 which read the original shown in FIG. 4A is stored in a column into the image buffer 104 in accordance with the order shown by an arrow in FIG. 4C. The address control is performed so as to sequentially execute the storage of each column in the direction from the left to the right (L→R). Subsequently, a check is made to see if the scanning direction signal is equal to "0" (step 27). If YES, the order of the columns to be read out from the image buffer 104, namely, the reading access direction is set to the direction from the right to the left (R→L) as shown in FIG. 4B (step 27). When the scanning direction signal is not equal to "0", namely, when it is equal to "1", the reading access direction is set to the direction from the left to the right (L→R) as shown in FIG. 4C (step 28). The address control is executed so as to read out the digital image data from the image buffer 104 in the access direction decided in step 27 or 28 (step 29). When there is a next original in the automatic document feeder 500 (step 30), the processing routine is returned to step 21. When there is no next original in step 30, the processing routine is finished.

By such a control of the reading access direction, the same image as the original can be copied for both of the front and back surfaces of the original without becoming the mirror images. As mentioned above, by the feeding control of the both-side original and the address control of the image buffer 104, the high speed copying apparatus can be provided.

In the above embodiment, although the address when reading out the image data from the image buffer 104 has been controlled, the address when the image data is stored into the image buffer 104 can be also controlled by the buffer control unit 106. Namely, it is also possible to construct the apparatus in a manner such that when the scanning direction signal is equal to "0", in step 25, the writing access direction of the digital image data is set to (L→R) and, when the scanning direction signal is equal to "1", the writing access direction is set to (R→L), and the reading access direction is always set to (R→L).

What is claimed is:

1. An image reading apparatus comprising:

original conveying means for conveying, in a case of a both-side original, one side of the original to a reading position through a first path, moving the original in a first direction at the reading position, then conveying the other side of the original to the reading position through a looped second path, moving the original in a second direction opposite to the first direction at the reading position, and then discharging the original to a discharge tray through a third path without passing it through the reading position, and for conveying, in a case of a one-side original, the original to the reading position through the first path, moving the original in the first direction at the reading position, and then discharging the original to said discharge tray through a fourth path branched from a halfway point of the second path;

reading means for reading an image on the original while said original conveying means moves each side of the original at the reading position;

memory means for storing the image read by said reading means; and control means for controlling an address either to store the image into said memory means or an address to read out the image from said memory means, according to whether the original is conveyed from either the first path or the second path.

2. An apparatus according to claim 1, wherein said control means sets an address column to read out the image from said memory means to a third direction when said exposure scanning means exposes and scans the original in said first direction and sets an address column to read out the image from said memory means to a fourth direction opposite to said third direction when said exposure scanning means exposes and scans the original in said second direction.

3. An apparatus according to claim 1, wherein said control means sets an address column to write the image into said memory means to a third direction when said exposure scanning means exposes and scans the original in said first direction and sets an address column to write the image into said memory means to a fourth direction opposite to said third direction when said exposure scanning means exposes and scans the original in said second direction.

4. The apparatus according to claim 1, wherein said original conveying means discharges the original through said third path different from said first path.

5. The apparatus according to claim 4, wherein said first path is provided to turn one side faced upward, upside down and said third path is provided to turn the other side faced downward, upside down.

6. The apparatus according to claim 5, wherein said second and third paths together constitute an S-shape path.

7. The apparatus according to claim 1, further comprising image forming means for forming the image read out from said memory means onto a sheet.

8. The apparatus according to claim 1, wherein in the case of a relatively large original, said original conveying means repeats a process that the original is conveyed twice from said second path after the original is conveyed twice from said first path, and in the case of a relatively small original, said original conveying means repeats a process that the original is conveyed once from said second path after the original conveyed once from said first path.

9. An image reading method comprising:

an original conveying step of conveying, in a case of a both-side original, one side of the original to a reading position through a first path, moving the original in a first direction at the reading position, then conveying the other side of the original to the reading position through a looped second path, moving the original in a second direction opposite to the first direction at the reading position, and then discharging the original to a discharge tray through a third path without passing it through the reading position, and of conveying, in a case of a one-side original, the original to the reading position through the first path, moving the original in the first direction at the reading position, and then discharging the original to said discharge tray through a fourth path branched from a halfway point of the second path;

a reading step for reading an image on the original while said original conveying step moves each side of the original at the reading position;

a storage step of storing the image read in said reading step into a memory; and a control step of controlling an address either to store the image into the memory or an address to read out the image from the memory, according to whether the original is conveyed from either said first path or said second path.

10. A method according to claim 9, wherein in said control step, when the original is exposed and scanned in said first direction, an address column to read out the image from said memory is set to a third direction, and when the original is exposed and scanned in said second direction, an address column to read out the image from said memory is set to a fourth direction opposite to said third direction.

11. A method according to claim 9, wherein in said control step, when the original is exposed and scanned in said first direction, an address column to write the image into said memory is set to a third direction, and when the original is exposed and scanned in said second direction, an address column to write the image into said memory is set to a fourth direction opposite to said third direction.

12. The method according to claim 9, wherein said original conveying step discharges the original through said third path different from said first path.

13. The method according to claim 12, wherein said first path is to turn one side faced upward, upside down and said third path is to turn the other side faced downward, upside down.

14. The method according to claim 13, wherein said second and third paths together constitute an S-shape path.

15. The method according to claim 9, further comprising an image forming step of forming the image read out from the memory onto a sheet.

16. The method according to claim 9, wherein in case of a relatively large original, said original conveying step repeats a process that the original is conveyed twice from the second path after the original is conveyed twice from the first path, and in case of a relatively small original, said original conveying step repeats a process that the original is conveyed once from the second path after the original is conveyed once from the first path.

* * * * *

UNITED STATES PATENT AND TRADEMARK OFFICE
CERTIFICATE OF CORRECTION

PATENT NO. : 6,181,443 B1  
DATED : January 30, 2001  
INVENTOR(S) : Tadashi Takahashi, et al.

It is certified that error appears in the above-identified patent and that said Letters Patent is hereby corrected as shown below:

Column 2,
Line 2, "control, of" should read -- control of --; and
Line 58, "Thus" should read -- Thus, --.

Column 3,
Line 27, "read" should read -- reads --; and
Line 62, "construct" should read -- construct the apparatus --.

Column 5,
Line 25, "read" should read -- reads --.

Column 8,
Line 24, "and in" should read -- and ¶ in --.

Signed and Sealed this

Thirteenth Day of November, 2001

Attest:

NICHOLAS P. GODICI
*Attesting Officer*     *Acting Director of the United States Patent and Trademark Office*